United States Patent
Saari et al.

(10) Patent No.: US 10,990,727 B1
(45) Date of Patent: Apr. 27, 2021

(54) METHOD FOR RADIATION HARDENING OF INTEGRATED CIRCUITS

(71) Applicant: BAE Systems Information and Electronic Systems Integration Inc., Nashua, NH (US)

(72) Inventors: Brian A. Saari, Manassas, VA (US); Stephen A. Chadwick, Bristow, VA (US); Jason T. Dowling, Ijamsville, MD (US); Michael J. Frack, Reva, VA (US); David D. Moser, Haymarket, VA (US); Mark R. Shaffer, Culpeper, VA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 17/016,816

(22) Filed: Sep. 10, 2020

(51) Int. Cl.
  *G06F 30/33* (2020.01)
  *G06F 30/343* (2020.01)
  (Continued)

(52) U.S. Cl.
  CPC .......... *G06F 30/33* (2020.01); *G06F 30/333* (2020.01); *G06F 30/343* (2020.01);
  (Continued)

(58) Field of Classification Search
  CPC ...... G06F 30/33; G06F 30/333; G06F 30/343; G06F 30/3308; G06F 30/337; G06F 30/398
  (Continued)

(56) References Cited

U.S. PATENT DOCUMENTS

| 5,923,830 A * | 7/1999 | Fuchs ................ G06F 11/1641 714/11 |
| 2009/0234484 A1 * | 9/2009 | Vacar ................... G06F 11/008 700/110 |

(Continued)

OTHER PUBLICATIONS

Caldwell, "Minimalist Fault-Tolerant Techniques for Mitigating Single-Event Effects in Non-Radiation-Hardened Microcontrollers", University of California, LA, 1998, 250 pages. (Year: 1998).*

(Continued)

*Primary Examiner* — Phallaka Kik
(74) *Attorney, Agent, or Firm* — Finch & Maloney PLLC (57) ABSTRACT

An IC design enhancing tool for automatically reviewing and environmentally hardening an IC design layout. The IC design enhancing tool may be realized, for example, in software that scans through an IC netlist generated by an electronic design automation (EDA) tool and replaces components that are not compliant with one or more hardening criteria. The newly created netlist can then be re-checked by the EDA tool and an iterative process takes place between the EDA tool and the IC design enhancing tool until the final design layout is fully compliant for a given environment. Interrogation of the IC design layout involves determining if at least a portion of the hardware layout netlist meets one or more predetermined hardening criteria. If it does not, then one or more of the hardware components are replaced using one or more predefined hardened components.

20 Claims, 6 Drawing Sheets

(51) Int. Cl.
*G06F 30/3308* (2020.01)
*G06F 30/337* (2020.01)
*G06F 30/398* (2020.01)
*G06F 30/333* (2020.01)

(52) U.S. Cl.
CPC ........ *G06F 30/337* (2020.01); *G06F 30/3308* (2020.01); *G06F 30/398* (2020.01)

(58) Field of Classification Search
USPC ................. 716/112, 106, 132, 136; 703/15
See application file for complete search history.

(56) References Cited

U.S. PATENT DOCUMENTS

2011/0302477 A1* 12/2011 Goss ................. G11C 16/0483
714/773
2013/0173970 A1* 7/2013 Kleveland ............ G11C 29/808
714/710
2019/0325167 A1* 10/2019 Hershman ............. H04L 9/0897

OTHER PUBLICATIONS

Dr. Holbert, "Single Event Effects", Holbert@asu.edu, Jan. 18, 2006, 11 pages. (Year: 2006).*
Bohman, et al., "Microcontroller Compiler-Assisted Software Fault Tolerance," IEEE Transactions on Nuclear Science, vol. 66, No. 1, Jan. 2019. pp. 223-232.
James, et al, "Applying Compiler-Automated Software Fault Tolerance to Multiple Processor Platforms," IEEE Transactions on Nuclear Science, vol. 67, No. 1, Jan. 2020. pp. 321-327.
Stirk, W. & Goeders, J., "Implementation and Design Space Exploration of a Turbo Decoder in High-Level Synthesis," 2019 International Conference on ReConFigurable Computing and FPGAs (ReConFig), Dec. 9-11, 2019. 5 pages.

* cited by examiner

METHOD FOR RADIATION HARDENING OF INTEGRATED CIRCUITS

GOVERNMENT LICENSE RIGHTS

This invention was made with government support under contract #BB01050632 awarded by the Defense Advanced Research Projects Agency (DARPA). The government has certain rights in the invention.

BACKGROUND

Integrated circuits (ICs) can contain any number of different components that work together to perform particular functions. These ICs may also be used in different environments, some of which can be very challenging and cause errors in the operation of the ICs. For instance, extreme heat exposure over an extended period of time (e.g., 125° C. or higher over many hours, days, weeks or even years) can cause electromigration within semiconductor devices. Likewise, exposure to radiation can cause so-called soft errors within semiconductor devices such as single event upsets (SEUs) and single event transients (SETs). These environmental effects may cause, for example, some bits to change from logic '0' to logic '1' or vice-versa, which can adversely impact IC performance. Efforts to harden ICs against such environmental effects during the IC design phase are profoundly limited, time consuming, and inefficient as existing electronic design automation (EDA) tools do not check for such environmental effects, which means designers are left to manually inspect register transfer logic (RTL) code to verify the compliance of each component. Thus, the designer effectively has to hand write the RTL code to choose the correct components. This approach does not work with systems that utilize technology independent code (e.g., proprietary systems). Furthermore, such an approach becomes nearly impossible for large, complex IC designs due to the amount of components and/or code and interdependencies involved. Accordingly, there are many non-trivial issues with regards to hardening ICs against environmental effects such as thermal and radiation.

BRIEF DESCRIPTION OF THE DRAWINGS

Features and advantages of embodiments of the claimed subject matter will become apparent as the following Detailed Description proceeds, and upon reference to the Drawings, in which:

Although the following Detailed Description will proceed with reference being made to illustrative embodiments, many alternatives, modifications, and variations thereof will be apparent in light of this disclosure.

DETAILED DESCRIPTION

An IC design enhancing tool is disclosed for automatically reviewing and environmentally hardening an IC design layout generated by an electronic design automation (EDA) tool. The IC design enhancing tool may be realized, for example, in software that scans through an IC netlist and replaces components that are not compliant with one or more environmental performance criteria. Note that the IC design tool may be integrated into the EDA tool, or downstream from the EDA tool in a given work flow. In any case, the newly created netlist can then be checked once again by the EDA tool and an iterative process takes place between the EDA tool and the IC design enhancing tool until the final design layout is fully compliant for a given specification and environment. Interrogation of the IC design layout involves determining if at least a portion of the hardware layout netlist meets one or more predetermined hardening criteria. If it does not, then one or more of the hardware components are replaced in the netlist using one or more predefined hardened components. As will be appreciated, the techniques can be used with any number of EDA tools and with any number of register transfer logic (RTL) codes, including standard and proprietary tools and codes. Numerous embodiments and variations will be appreciated in light of this disclosure.

General Overview

Integrated circuits (ICs) rely on a network of logic '1's and '0's constantly being transferred between different components. Sometimes, the environment can play a role in how reliable the IC is. Very hot environments or environments with high radiation can cause problems by changing one or more bits on certain signal paths within the IC or by accelerating electromigration along certain interconnects. This can be especially critical for space applications where ICs onboard various space craft may need to be designed to withstand temperatures as high as 125C for many years and must also withstand high radiation from the sun and other interstellar bodies. Unfortunately, most EDA tools available today do not account for such extreme environmental conditions when providing design rules for ICs. As such, and as previously explained, the process of environmentally hardening a given IC to function in such environments involves manual inspection of hardware code to determine which components are non-compliant. This manual inspection is both time-consuming and prone to mistakes due to human error and is oftentimes simply impractical or not possible.

Thus, and according to an embodiment of the present disclosure, a method of automatically checking and hardening an IC design is provided. The method involves using a set of predefined criteria for various components to check if the component is compliant for a given environment. For example, certain portions of the IC design may be checked against one or more of possible single event transient (SET) effects, single event upset (SEU) effects, and/or electromigration (EM) effects. SET effects cause a momentary change of a '0' bit to a '1' bit or vice-versa, while SEU effects cause a stored '0' or '1' value (e.g., in a register) to flip. EM effects can cause failure of an interconnect or detrimentally increase the resistance of an interconnect. In some examples, components that involve a heavy amount of switching are more prone to causing EM-based failure. If the component is found to be non-compliant against any of SET, SEU, or EM type effects, then the method automatically replaces the non-compliant component with one that is compliant or recreates the functionality of the non-compliant component using a plurality of compliant components. The method may be carried out in software via a scripting language, such as a tool command language (Tcl). The software may work in conjunction with other hardware layout tools, such as any standard EDA tool, in an iterative fashion to generate a hardware layout netlist for fabricating an environmentally hardened IC.

In one specific embodiment, a method for environmentally hardening an integrated circuit (IC) includes receiving a hardware layout netlist for the IC; initializing a group of hardware components for potential use within the IC; interrogating at least a portion of the hardware layout netlist, wherein the interrogating comprises determining if the at least a portion of the hardware layout netlist meets one or more predetermined hardening criteria; and in response to the at least a portion of the hardware layout netlist not meeting the one or more predetermined hardening criteria, replacing one or more hardware components of the at least a portion of the hardware layout netlist with one or more hardware components from the group of hardware components in order to generate a hardened hardware layout netlist, wherein the hardened hardware layout netlist provides a layout for fabricating an environmentally hardened IC.

In another embodiment, a system designed to produce an environmentally hardened hardware layout netlist includes at least one processor and a storage medium coupled to the at least one processor. The storage medium stores instructions that when executed by the at least one processor cause the at least one processor to perform various operations. The operations include receiving a hardware layout netlist for an integrated circuit (IC); initializing a group of hardware components for potential use within the IC; interrogating at least a portion of the hardware layout netlist, wherein the interrogating comprises determining if the at least a portion of the hardware layout netlist meets one or more predetermined hardening criteria; and in response to the at least a portion of the hardware layout netlist not meeting the one or more predetermined hardening criteria, replacing one or more hardware components of the at least a portion of the hardware layout netlist with one or more hardware components from the group of hardware components in order to generate the environmentally hardened hardware layout netlist, wherein the environmentally hardened hardware layout netlist provides a layout for fabricating an environmentally hardened IC.

Numerous other embodiments and variations will be appreciated in light of this disclosure.

IC Hardening Process

Figure 1:
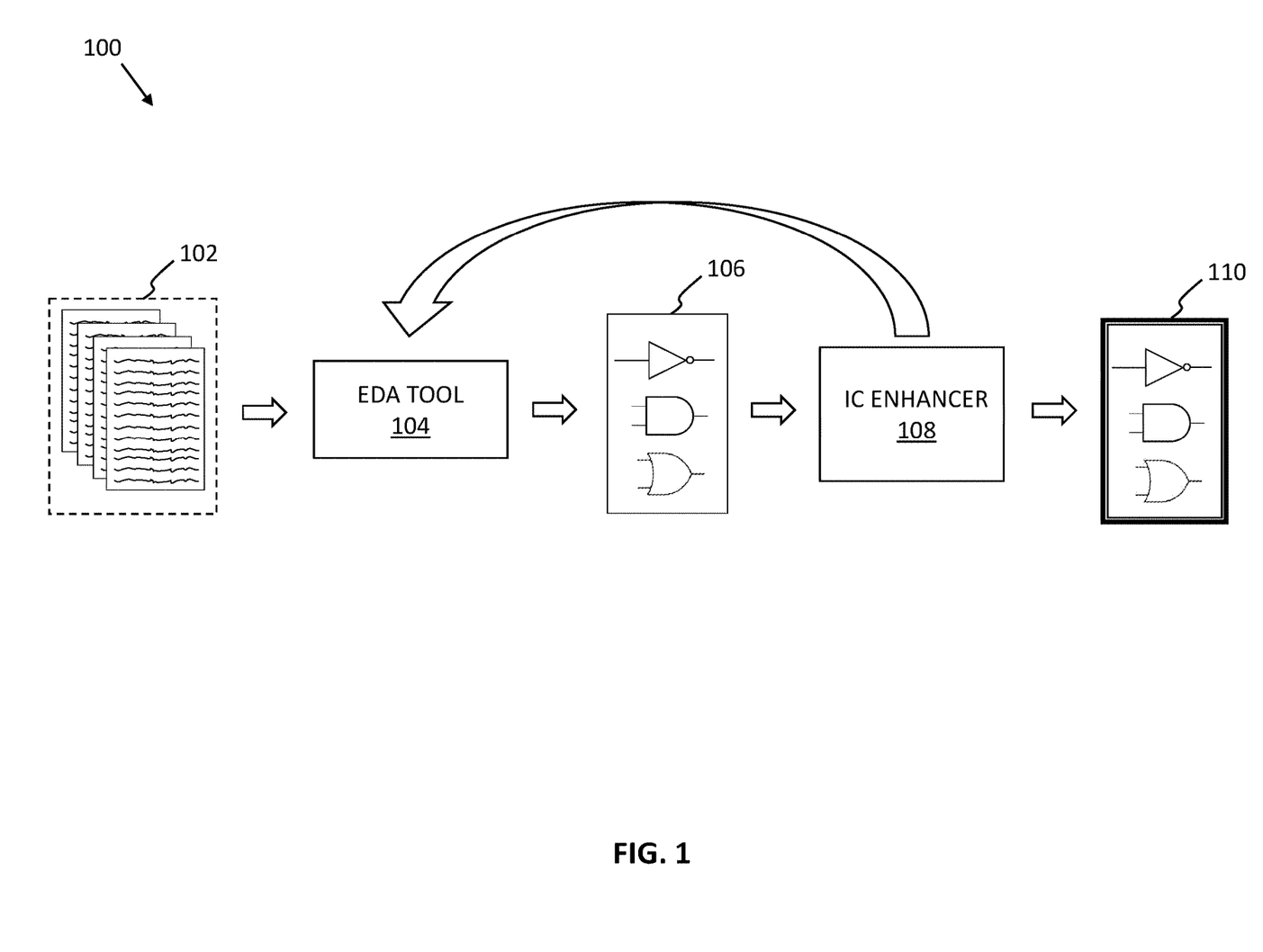
FIG. 1 illustrates a block diagram of an example IC development timeline, in accordance with an embodiment of the present disclosure.

FIG. 1 illustrates an example IC process flow 100, according to an embodiment. IC process flow 100 includes various operations that may be performed over one or more computing devices. Furthermore, data that is generated at any point along the way may be stored and used again at any layer time or on a different system from where the data was generated from. IC process flow 100 may be executed in software, hardware, or a combination of both. For example, hardware devices such as field programmable gate arrays (FPGA) or application specific integrated circuits (ASIC) may be designed to carry out one or more of the functions of IC process flow 100.

IC process flow 100 includes a raw IC design 102, according to an embodiment. Raw IC design 102 may be represented as several lines of code in a register transfer level (RTL) coding language that details the desired functionality of an IC to be fabricated. Some examples of RTL coding languages include VHDL and Verilog. According to some embodiments, raw IC design 102 is highly complex which makes it difficult to determine which components that carry out the functions detailed in raw IC design 102 are environmentally compliant based on the code alone from IC design 102.

Raw IC design 102 is received by an EDA tool 104 that compiles the RTL coding language to generate an IC netlist 106 that represents node locations for the layout of logic gates, interconnects, registers, etc., according to an embodiment. EDA tool 104 may represent any standard hardware design tool that generates a netlist or similar construct that acts as a blueprint for the IC design layout on a chip. EDA tool 104 may consider numerous design constraints and design rules when generating IC netlist 106. These design constraints are often predetermined by the manufacturer and are based on typical operating conditions for the IC. However, such design constraints for standard EDA tools are not suited for developing ICs that can withstand extreme conditions, such as those found in space.

Thus, and in accordance with an embodiment, an IC enhancer 108 is provided within IC process flow 100 that takes the netlist 106 output from or otherwise generated by EDA tool 104, interrogates one or more portions of the netlist, and swaps out components that are found to be non-compliant for a given environment with one or more components that are compliant. The swapped out components can include any one or more of buffers, inverters, multi-input and/or multi-output logic gates, registers, and multiplexers, just to name a few examples. Components may be found to be non-compliant if they fail to meet certain predetermined criteria. The predetermined criteria may be set by a user or automatically determined based on environmental factors provided by a user, according to some embodiments. For example, the predetermined criteria for a flip-flop register may include minimum sizes of the transistors used and/or minimum power requirements in order to ensure that the flip-flop register is hardened against any one or more of SET, SEU, and EM effects in a space environment. Different criteria may exist for different component types. In some embodiments, the criteria for a given component to be considered compliant is based at least in part on what is being driven by the output of the component.

IC enhancer 108 may represent software written in a scripting language such as Tcl and stored on any memory medium. In some embodiments, IC enhancer 108 changes the received netlist 106 by replacing components that are non-compliant. However, the netlist must be checked again by EDA tool 104 to ensure that the newly added components do not violate any other design rules and to ensure that all interconnects are still routed correctly between all components of the IC design. Accordingly, IC enhancer 108 provides the updated netlist back to EDA tool 104, which generates a new netlist to be interrogated once again by IC enhancer 108. This process can iterate any number of times, until IC enhancer 108 finds that all components of the most recently received netlist are environmentally compliant. Once the iterative loop ends, an environmentally hardened netlist 110 is generated that can be used to fabricate an IC that will withstand whatever environment it has been hardened against. Note that IC enhancer 108 is shown as downstream from EDA tool 104 in this example embodiment, but in other embodiments IC enhancer 108 is integrated into EDA tool 104. In any such case, IC enhancer 108 has access to the netlist generated by EDA tool 104.

Figure 2:
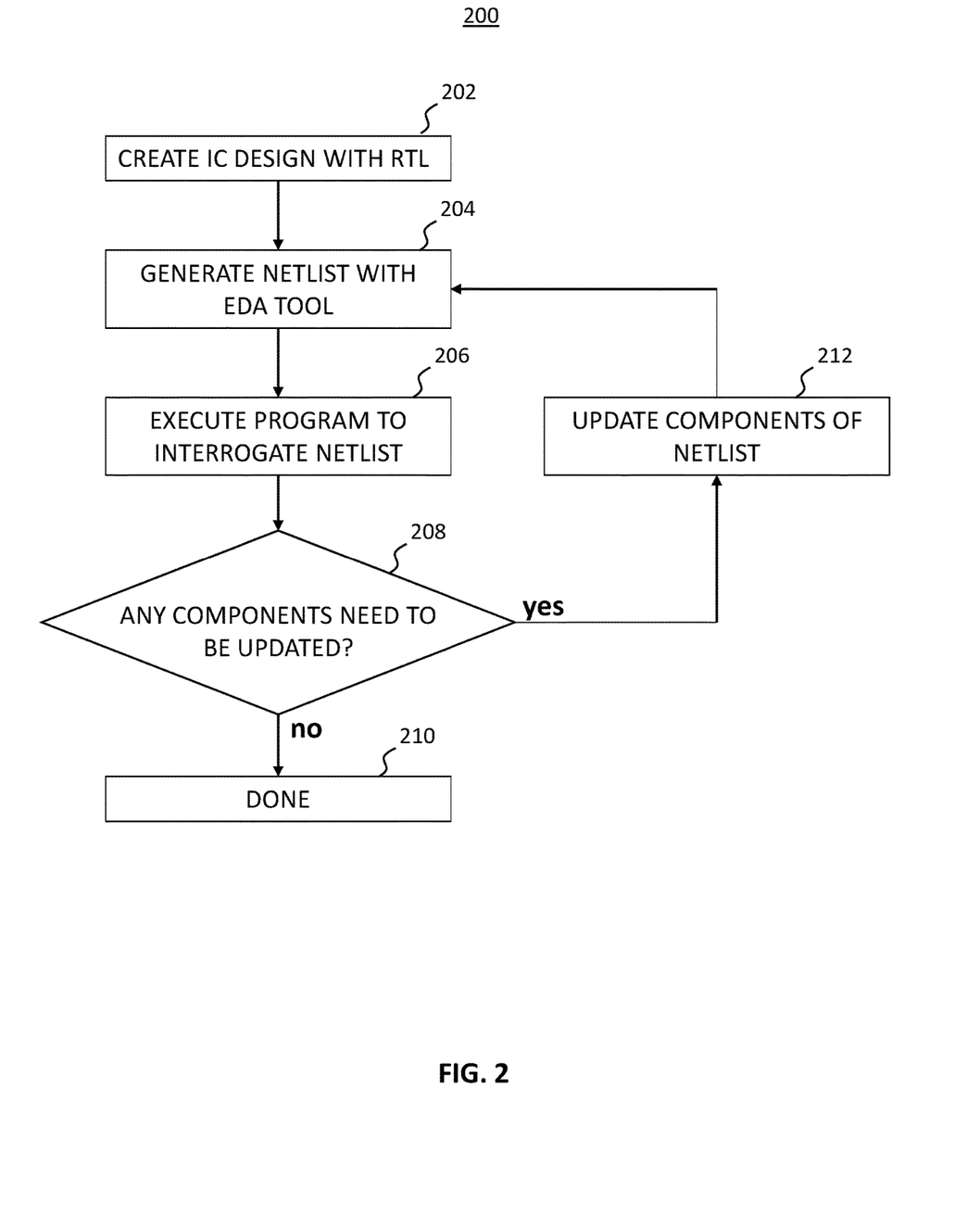
FIG. 2 is a flow chart of an example method for creating a layout for an IC design, in accordance with an embodiment of the present disclosure.

FIG. 2 illustrates an example flow diagram for a method 200 of environmentally hardening an IC design, according to an embodiment. Method 200 may be performed, for example, by one or more of the components illustrated in IC process flow 100. The operations, functions, or actions described in the respective blocks of example method 200 may be stored as computer-executable instructions in a non-transitory computer-readable medium, such as a memory and/or a data storage of a computing system. As will be further appreciated in light of this disclosure, for this and other processes and methods disclosed herein, the functions performed in method 200 may be implemented in a differing order. Additionally, or alternatively, two or more operations may be performed at the same time or otherwise in an overlapping contemporaneous fashion.

Method 200 begins with block 202 where an IC design is initially created using a scripting language, according to an embodiment. The scripting language may be any hardware level scripting language such as VHDL or Verilog. The IC design at this stage may include only the desired functionality of the IC without specifying particular hardware components.

Method 200 proceeds to block 204 where an EDA tool receives the IC design from block 202 and generates a netlist that represents a hardware layout for the IC, according to an embodiment. The EDA tool instantiates the hardware necessary to perform the functionality detailed in the IC design. Furthermore, the EDA tool selects hardware components to perform the functionality while considering both power and die-space constraints and routes interconnects between the various hardware components. The netlist provides a map of sorts for the various nodes that define hardware locations and types. EDA tools do not inherently design the IC to survive particular environmental conditions. Rather, EDA tools typically select components that yield the lowest overall power consumption.

Method 200 proceeds to block 206 where an IC enhancer program is executed to interrogate the netlist generated from the EDA tool, according to an embodiment. The interrogation involves determining, at block 208, if one or more of the hardware components from the netlist are environmentally compliant for a given environment, such as a space environment. Compliancy may rely on whether or not a component passes certain hardening criteria, such as size requirements, power consumption requirements, or drive strength requirements, depending on where the component is located within the circuit and what its output is being used to drive. If no components need to be updated, then method 200 is done at block 210.

If any components are found to not meet the predetermined hardening criteria, then they need to be updated to be compliant. Method 200 proceeds to block 212 where one or more of the non-compliant components are updated. Updating a component may involve swapping the component with a similar component that does meet the criteria. For example, the updating may involve swapping an AND gate for a larger version (e.g., having larger transistors). However, in some cases a component cannot be swapped out in a one-to-one manner, and in these situations a component may be replaced with a new circuit to perform the same function, according to an embodiment. Further details regarding the procedure of determining components to update and updating the components are found with reference to FIG. 5.

Figure 3:
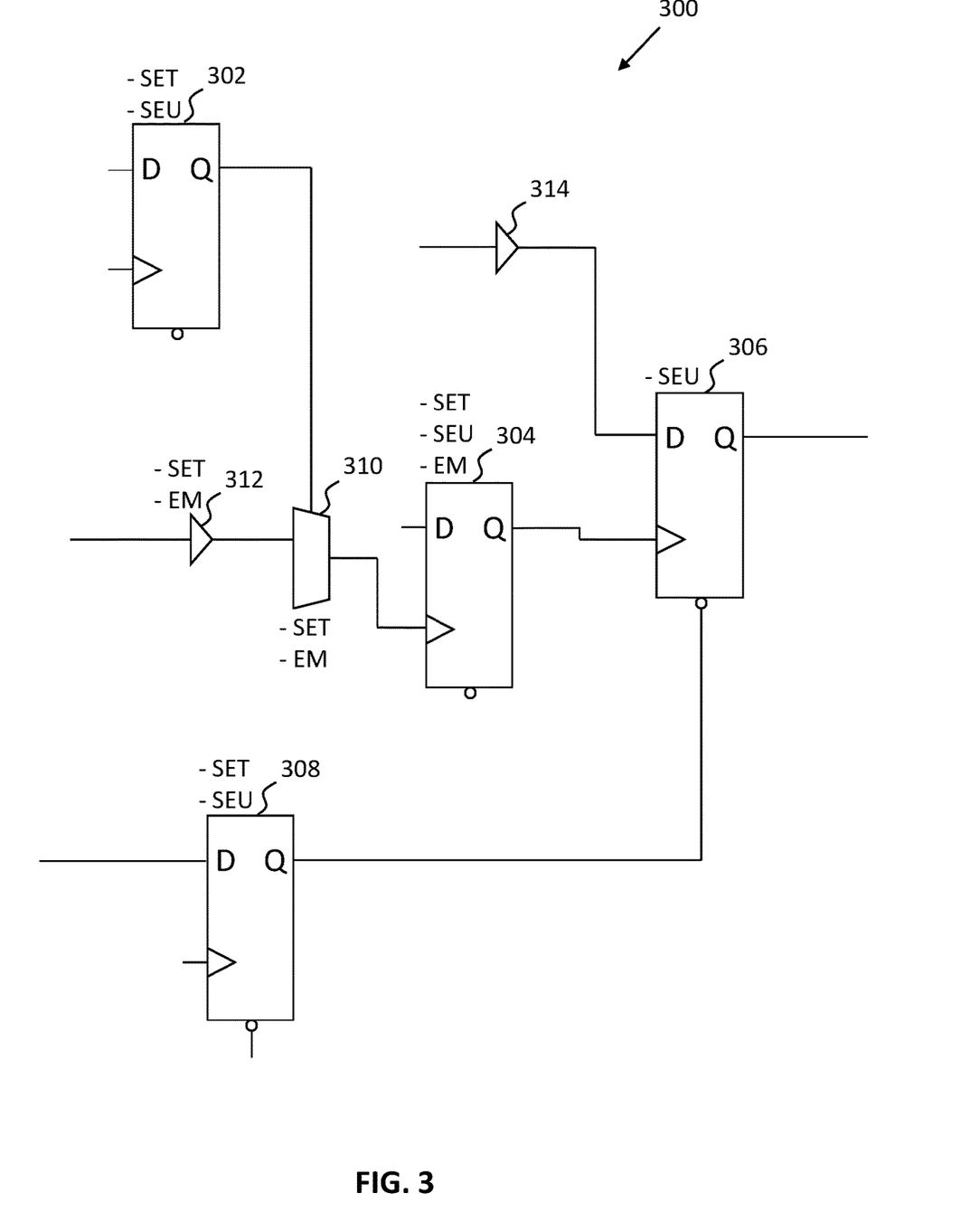
FIG. 3 illustrates an example schematic of a digital circuit, in accordance with an embodiment of the present disclosure.

FIG. 3 illustrates an example IC portion 300 that includes a plurality of flip-flop registers 302-308, a multiplexer 310, and inverters 312 and 314. IC portion 300 may represent a fraction of a netlist generated from an EDA tool. Also illustrated are various interconnects between the hardware components.

According to some embodiments, various components may be susceptible to certain environmental effects, such as SET, SEU, and EM effects. For example, some components having outputs that drive clocks (such as inverter 312, multiplexer 310, and register 304) are prone to SET effects, since even momentary bit changes have a large impact on the operation of the circuit, and are prone to EM effects, since the constant switching of the clock lines creates a lot of current moving across the interconnects. Accordingly, inverter 312 and multiplexer 310 may be flagged for replacement with a corresponding component that is hardened against both SET and EM effects, according to some embodiments. Since register 304 stores bit data, it is also prone to SEU effects. Accordingly, register 304 may be flagged for replacement with a corresponding component that is hardened against each of SET, SEU, and EM effects, according to some embodiments.

In another example, the output of register 302 drives a select input to multiplexer 310 while the output of register 308 drives a reset input of register 306. In addition to being prone to SEU effects since they store data, each of register 302 and register 308 is prone to SET effects since even a momentary blip on the output can negatively impact the operation of multiplexer 310 and register 306, respectively, according to an embodiment. Thus, both register 302 and register 308 may be flagged for replacement with a corresponding component that is hardened against both SET and SEU effects, according to some embodiments.

In the case of register 306, its output is used to define what type of environmental hardening the register needs, according to an embodiment. In the illustrated example, only SEU hardening is required for register 306, meaning that the output is likely received by a logic circuit or the data input of another register. Accordingly, register 306 may be flagged for replacement with a corresponding component that is hardened against only SEU effects, according to some embodiments.

Not all components within an IC need environmental hardening. For example, some components do not drive any inputs that are prone to failures from any of SET, SEU, or EM effects. In the illustrated example, inverter 314 only drives the data input to register 306. Accordingly, there is much less concern regarding the output of inverter 314 with regards to SET, SEU, and EM effects, and thus inverter 314 would not need to be interrogated to determine if it is compliant.

The criteria for environmentally hardening a component is different depending on what it is being hardened against, according to some embodiments. For example, components may need to be even larger to harden against both SET and SEU effects as compared to hardening against only SEU effects. Furthermore, components may need to be even larger to harden against each of SET, SEU, and EM effects as compared to hardening against SET and SEU effects.

Figure 4:
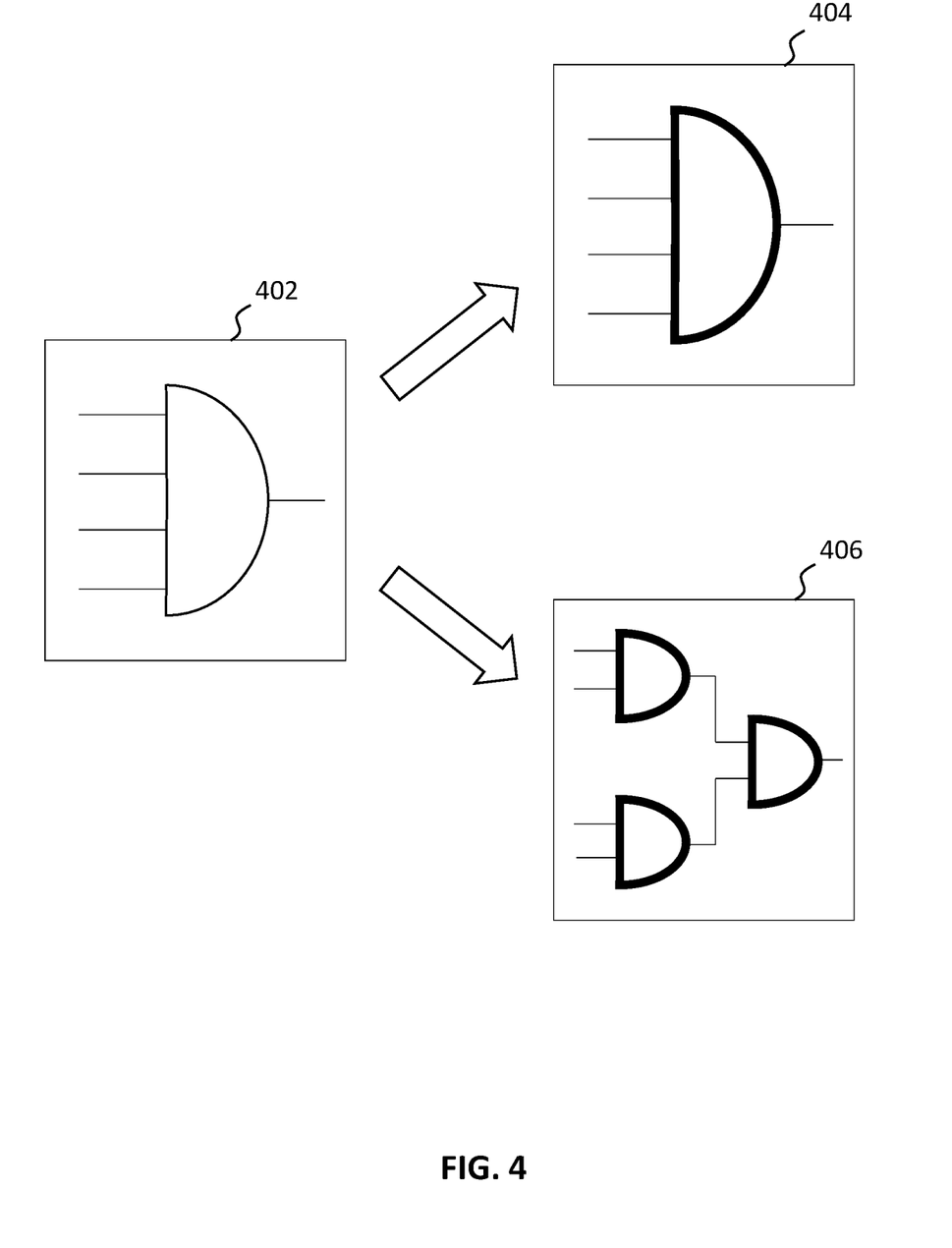
FIG. 4 is a block diagram graphically illustrating a process of environmentally hardening a digital component, in accordance with an embodiment of the present disclosure.

FIG. 4 illustrates an example of replacing a four-input AND gate 402 with either a hardened four-input AND gate 404 or a circuit 406, according to some embodiments. In the illustrated example, a four-input AND gate is determined by the IC enhancer program to be non-compliant, however, the example can apply to any hardware component such as any type of logic gate, register, multiplexer, or buffer, to name a few examples. Accordingly, the IC enhancer program may attempt a first option where four-input AND gate 402 is replaced with hardened four-input AND gate 404 that is compliant. In some examples, hardened four-input AND gate 404 uses larger transistors compared to the original four-input AND gate 402. However, due to any of space, power, or design restrictions, it may not be possible to replace four-input AND gate 402 with the larger hardened four-input AND gate 404. In such a situation, a second option can be attempted where circuit 406 is developed to perform the same functionality as four-input AND gate 402 using a collection of compliant components. In the illustrated example, circuit 406 includes three two-input AND gates and has the same functionality as four-input AND gate 402. Any number and/or type of components could be used to form circuit 406.

Figure 5:
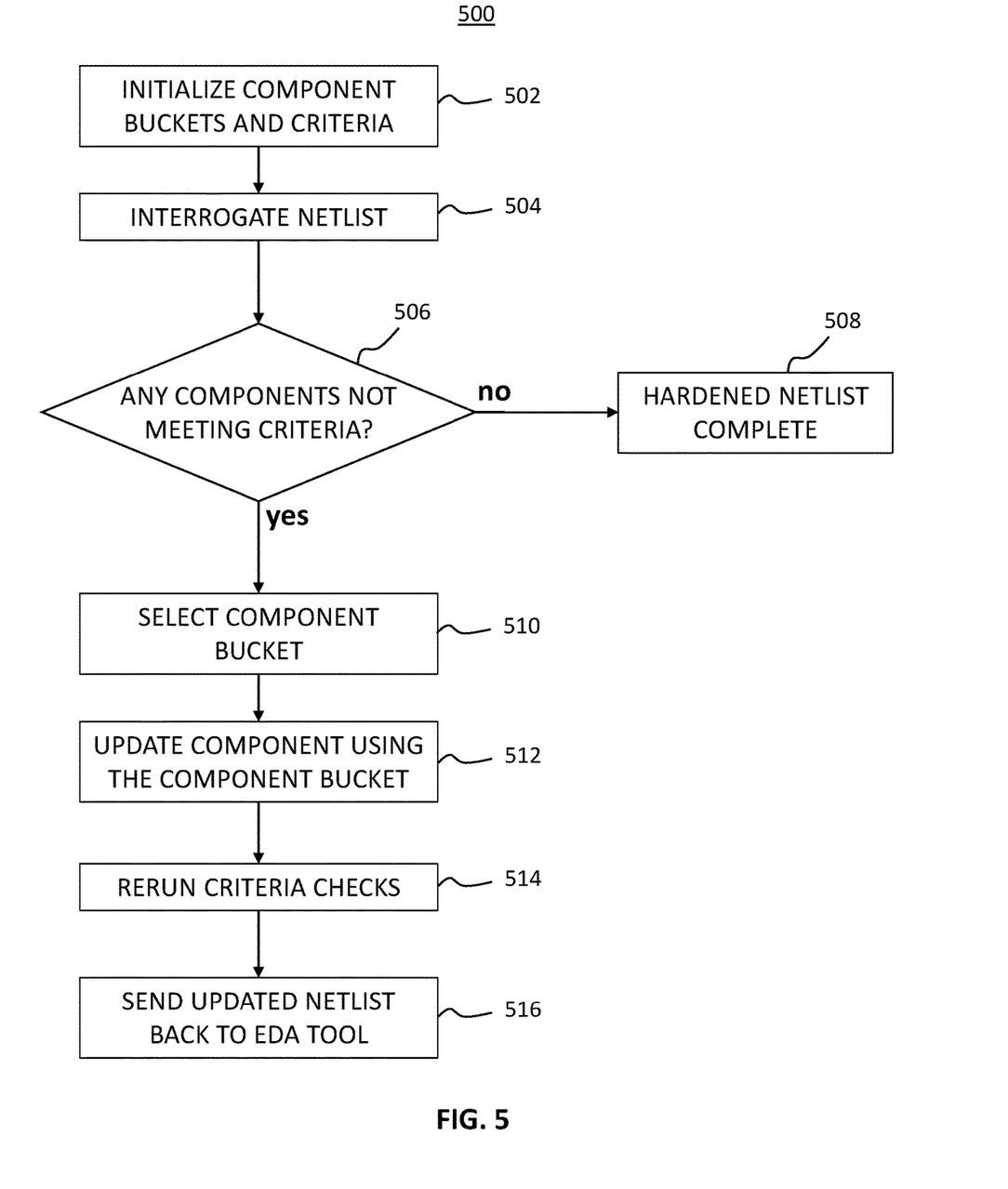
FIG. 5 is a flow chart of an example method for environmentally hardening various components of an IC, in accordance with an embodiment of the present disclosure. The method can be used, for example, within the method of FIG. 2, according to some embodiments.

FIG. 5 illustrates an example flow diagram for a method 500 of enhancing a netlist received from or otherwise generated by an EDA tool in order to environmentally harden the IC, according to an embodiment. Method 500 may be performed, for example, by at least IC enhancer 108 illustrated in IC process flow 100, and may be downstream from or integrated with the EDA tool as previously explained, according to some such example embodiments. The operations, functions, or actions described in the respective blocks of example method 500 may be stored as computer-executable instructions in a non-transitory computer-readable medium, such as a memory and/or a data storage of a computing system. As will be further appreciated in light of this disclosure, for this and other processes and methods disclosed herein, the functions performed in method 500 may be implemented in a differing order. Additionally, or alternatively, two or more operations may be performed at the same time or otherwise in an overlapping contemporaneous fashion.

Method 500 begins at block 502 where various component buckets and criteria are initialized, according to an embodiment. The component buckets may include user-defined lists of different compliant components or component macros for the software to use when making replacements of the non-compliant components. The component buckets may be differentiated based on what types of environmental hardening is taking place. For example, for three different environmental effects (SET, SEU, and EM), 8 component buckets can be created to represent the various combinations of effects (e.g., $1^{st}$ bucket: no effects; $2^{nd}$ bucket: SET only; $3^{rd}$ bucket: SEU only; $4^{th}$ bucket: EM only; $5^{th}$ bucket: SET+SEU; $6^{th}$ bucket: SET+EM; $7^{th}$ bucket: SEU+EM; and $8^{th}$ bucket: SET+SEU+EM). Each bucket would include a list of components (buffers, registers, multiplexers, logic gates, etc.) that are environmentally hardened against the effects for that given bucket. Following the example given above, a register from the $5^{th}$ bucket would be used to replace register 308 from FIG. 3, while a register from the $8^{th}$ bucket would be used to replace register 304.

The criteria may be used to define what is expected from each component depending on what effects it needs to be hardened against. For example, a register that is only hardened against SEU effects may require a first set of criteria that may involve size of its transistors while another register that needs to be hardened against SEU, SET, and EM effects may require a second set of criteria that is more demanding than the first set of criteria (e.g., larger transistors, more metal used for interconnects, etc.) The criteria may be predetermined by a user depending on the environment that the IC will be subjected to. In some other embodiments, the criteria may be automatically defined based on certain parameters set by a user.

At block 504, the netlist received from the EDA tool is interrogated to determine if one or more of the components are non-compliant, according to an embodiment. In some examples, each component defined by the netlist is first reviewed to determine if any hardening is necessary for the given component. Then, for those components where hardening is needed, each component is reviewed to determine if the component meets the hardening criteria. As noted above, this criteria may be different depending on the component and depending on what effects the component needs to be hardened against. In some other examples, the user defines particular components or regions of the IC to be interrogated.

According to some embodiments, interrogation of the netlist proceeds by collecting a list of all component input pins. These may include any asynchronously timed signals like a clock or asynchronous reset pin that would potentially corrupt the state of a storage device if a SET effect was applied. In some embodiments, a list of pre-identified critical hard macro pins are included in the list if those building blocks happen to be present (e.g., components like phase locked loops (PLLs), serializers/deserializers (SERDES), or any other pre-existing circuits that have known critical/sensitive input pins). Once the input pins are collected, the interrogation then back-traces from these input pins to collect all of the components used in the circuit feeding these pins. If the components are noncompliant relative to what types of hardening (e.g., any of SET, SEU, or EM) is needed for the given input, then the noncompliant components are flagged to be replaced, according to an embodiment.

At block 506, a determination is made regarding whether any of the components are found to not meet the hardening criteria, according to an embodiment. If all of the components do meet the hardening criteria, then the IC is environmentally hardened and the hardened netlist is complete at block 508. The hardened netlist may then be used in the fabrication of the environmentally hardened IC.

If one or more of the components are found to not meet the hardening criteria, then method 500 proceeds to block 510 where a component bucket is chosen for each component that needs to be replaced, according to an embodiment. The component bucket may be chosen based on the type of hardening that is required for the given component (e.g., SET only, SET and SEU, etc.) Each component bucket includes a predefined list of hardened components or component macros to be potentially used as the replacement. For example, if a 2-input multiplexer is found to be non-compliant for both SET and EM effects, then the bucket associated with SET+EM would be chosen and a corresponding 2-input multiplexer from the bucket list would be selected to replace the non-compliant multiplexer.

In some embodiments, a replacement order is established dictating when certain components are replaced. For example, each of the non-compliant components that only need to be hardened against SET effects may be replaced together, followed by another group of components that only need to be hardened against SEU effects, and so forth until all components that need to be replaced are. In some other embodiments, components are replaced based on their location within the circuit, or based on some predefined priority.

At block 512, each component that is identified as being non-compliant is replaced with one or more compliant components from the component buckets, according to an embodiment. First, an attempt is made to replace a noncompliant component with a corresponding compliant component on a one-to-one basis. The one-to-one replacement is performed in an attempt to match the timing and power requirements of the non-compliant component as closely as possible, according to an embodiment. However, this is not always possible if, for example, the component either is not present in the component bucket, or if the component that is present would be too large for the circuit. Thus, if a one-to-one replacement cannot be performed, then the non-complaint component is replaced with a circuit that performs the same function but is made using compliant components, according to an embodiment.

In some embodiments, a first pass is made through the non-compliant components to determine if a one-to-one replacement is possible. Any components that cannot be replaced in a one-to-one manner are saved to be changed later. Once all components that could be replaced by a single component are done, then the remaining non-compliant components are replaced with functionally equivalent circuits, according to an embodiment.

At block 514, criteria checks are run once again across one or more of the components to ensure that the components are now compliant, according to an embodiment. In some examples, every component is checked again while in other examples only a subset of the components is checked again, as may be defined by a user or based on component type or priority.

At block 516, the updated netlist that includes the replaced components is sent back to the EDA tool in order to recreate the new layout using the updated components, according to an embodiment. The EDA tool is used again in order to ensure that all interconnects and design rules are still followed across the IC with all the added compliant components. Once a new netlist is generated from the EDA tool, method 500 may be repeated using the new netlist.

Example Computing Platform

Figure 6:
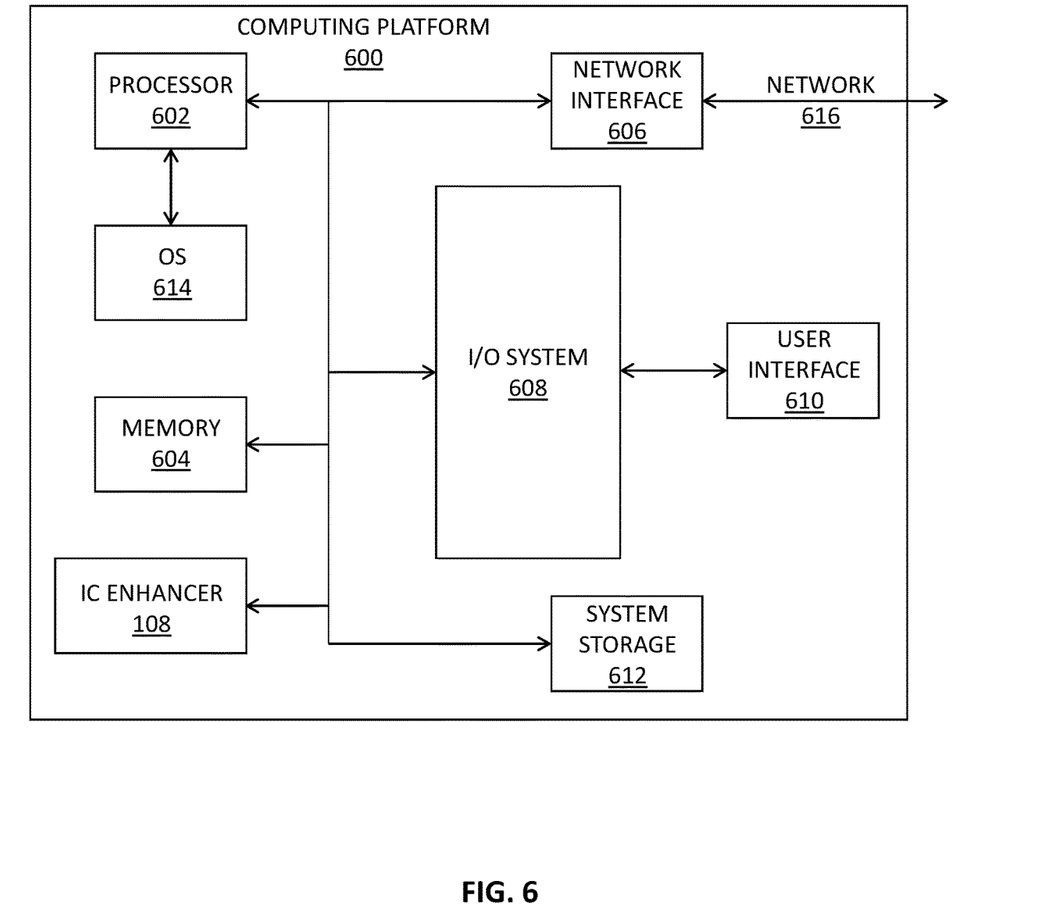
FIG. 6 illustrates a block diagram of an example computing platform that may execute software for environmentally hardening various components of an IC, in accordance with an embodiment of the present disclosure.

FIG. 6 illustrates an example computing platform 600 that may include IC enhancer 108, in accordance with certain embodiments of the present disclosure. In some embodiments, computing platform 600 may host, or otherwise be incorporated into a personal computer, workstation, server system, laptop computer, ultra-laptop computer, tablet, touchpad, portable computer, handheld computer, palmtop computer, personal digital assistant (PDA), cellular telephone, combination cellular telephone and PDA, smart device (for example, smartphone or smart tablet), mobile internet device (MID), messaging device, data communication device, imaging device, wearable device, embedded system, and so forth. Any combination of different devices may be used in certain embodiments. IC enhancer 108 may represent software that is executed by a special purpose processor or by a processor 602. In some embodiments, IC enhancer 108 is implemented in hardware using, for example, an FPGA or ASIC that works in conjunction with processor 602 to environmentally harden an IC design provided by an EDA tool.

In some embodiments, computing platform 600 may comprise any combination of a processor 602, a memory 604, IC enhancer 108, a network interface 606, an input/output (I/O) system 608, a user interface 610, and a storage system 612. In some embodiments, IC enhancer 108 is implemented as part of processor 602. In some embodiments, IC enhancer 108 represents software that is stored on memory 604 or system storage 612. As can be further seen, a bus and/or interconnect is also provided to allow for communication between the various components listed above and/or other components not shown. Computing platform 600 can be coupled to a network 616 through network interface 606 to allow for communications with other computing devices, platforms, or resources. Other componentry and functionality not reflected in the block diagram of FIG. 6 will be apparent in light of this disclosure, and it will be appreciated that other embodiments are not limited to any particular hardware configuration.

Processor 602 can be any suitable processor and may include one or more coprocessors or controllers to assist in control and processing operations associated with computing platform 600. In some embodiments, processor 602 may be implemented as any number of processor cores. The processor (or processor cores) may be any type of processor, such as, for example, a micro-processor, an embedded processor, a digital signal processor (DSP), a graphics processor (GPU), a network processor, a field programmable gate array or other device configured to execute code. The processors may be multithreaded cores in that they may include more than one hardware thread context (or "logical processor") per core.

Memory 604 can be implemented using any suitable type of digital storage including, for example, flash memory and/or random access memory (RAM). In some embodiments, memory 604 may include various layers of memory hierarchy and/or memory caches as are known to those of skill in the art. Memory 604 may be implemented as a volatile memory device such as, but not limited to, a RAM, dynamic RAM (DRAM), or static RAM (SRAM) device. Storage system 612 may be implemented as a non-volatile storage device such as, but not limited to, one or more of a hard disk drive (HDD), a solid-state drive (SSD), a universal serial bus (USB) drive, an optical disk drive, tape drive, an internal storage device, an attached storage device, flash memory, battery backed-up synchronous DRAM (SDRAM), and/or a network accessible storage device. In some embodiments, storage system 612 may comprise technology to increase the storage performance enhanced protection for valuable digital media when multiple hard drives are included.

Processor 602 may be configured to execute an Operating System (OS) 614 which may comprise any suitable operating system, such as Google Android (Google Inc., Mountain View, Calif.), Microsoft Windows (Microsoft Corp., Redmond, Wash.), Apple OS X (Apple Inc., Cupertino, Calif.), Linux, or a real-time operating system (RTOS). As will be appreciated in light of this disclosure, the techniques provided herein can be implemented without regard to the particular operating system provided in conjunction with computing platform 600, and therefore may also be implemented using any suitable existing or subsequently-developed platform.

Network interface 606 can be any appropriate network chip or chipset which allows for wired and/or wireless connection between other components of computing platform 600 and/or network 616, thereby enabling computing platform 600 to communicate with other local and/or remote computing systems, servers, cloud-based servers, and/or other resources. Wired communication may conform to existing (or yet to be developed) standards, such as, for example, Ethernet. Wireless communication may conform to existing (or yet to be developed) standards, such as, for example, cellular communications including LTE (Long Term Evolution), Wireless Fidelity (Wi-Fi), Bluetooth, and/or Near Field Communication (NFC). Exemplary wireless networks include, but are not limited to, wireless local area networks, wireless personal area networks, wireless metropolitan area networks, cellular networks, and satellite networks.

I/O system 608 may be configured to interface between various I/O devices and other components of computing platform 600. I/O devices may include, but not be limited to, a user interface 610. User interface 610 may include devices (not shown) such as a display element, touchpad, keyboard, mouse, and speaker, etc. I/O system 608 may include a graphics subsystem configured to perform processing of images for rendering on a display element. Graphics subsystem may be a graphics processing unit or a visual processing unit (VPU), for example. An analog or digital interface may be used to communicatively couple graphics subsystem and the display element. For example, the interface may be any of a high definition multimedia interface (HDMI), DisplayPort, wireless HDMI, and/or any other suitable interface using wireless high definition compliant techniques. In some embodiments, the graphics subsystem could be integrated into processor 602 or any chipset of computing platform 600.

It will be appreciated that in some embodiments, the various components of the computing platform 600 may be combined or integrated in a system-on-a-chip (SoC) architecture. In some embodiments, the components may be hardware components, firmware components, software components or any suitable combination of hardware, firmware or software.

In various embodiments, computing platform 600 may be implemented as a wireless system, a wired system, or a combination of both. When implemented as a wireless system, computing platform 600 may include components and interfaces suitable for communicating over a wireless shared media, such as one or more antennae, transmitters, receivers, transceivers, amplifiers, filters, control logic, and so forth. An example of wireless shared media may include portions of a wireless spectrum, such as the radio frequency spectrum and so forth. When implemented as a wired system, computing platform 600 may include components and interfaces suitable for communicating over wired communications media, such as input/output adapters, physical connectors to connect the input/output adaptor with a corresponding wired communications medium, a network interface card (NIC), disc controller, video controller, audio controller, and so forth. Examples of wired communications media may include a wire, cable metal leads, printed circuit board (PCB), backplane, switch fabric, semiconductor material, twisted pair wire, coaxial cable, fiber optics, and so forth.

Some of the embodiments discussed herein may be implemented, for example, using a machine readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, process, or the like, and may be implemented using any suitable combination of hardware and/or software. The machine readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CR-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical quantities within the registers, memory units, or other such information storage transmission or displays of the computer system. The embodiments are not limited in this context.

The terms "circuit" or "circuitry," as used in any embodiment herein, is a functional apparatus and may comprise, for example, singly or in any combination, hardwired circuitry, programmable circuitry such as one or more computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc. Other embodiments may be implemented as software stored in a machine-readable medium and that can be executed by a programmable control device. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Thus, a circuit or circuitry is a functional physical apparatus that can be any of integrated circuitry, printed circuit board circuitry, gate-level logic, analog and/or digital circuitry, one or more programmed processors or processing entities (e.g., combination of instructions and one or more processors configured to execute those instructions).

Numerous specific details have been set forth herein to provide a thorough understanding of the embodiments. It will be understood by an ordinarily-skilled artisan, however, that the embodiments may be practiced without these specific details. In other instances, well known operations, components and circuits have not been described in detail so as not to obscure the embodiments. It can be appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Further Example Embodiments

The following examples pertain to further embodiments, from which numerous permutations and configurations will be apparent.

Example 1 is a processor-implemented method for environmentally hardening an integrated circuit (IC). The method includes receiving a hardware layout netlist for the IC; initializing a group of hardware components for potential use within the IC; interrogating at least a portion of the hardware layout netlist, wherein the interrogating comprises determining if the at least a portion of the hardware layout netlist meets one or more predetermined hardening criteria; and in response to the at least a portion of the hardware layout netlist not meeting the one or more predetermined hardening criteria, replacing one or more hardware components of the at least a portion of the hardware layout netlist with one or more hardware components from the group of hardware components as part of a procedure to generate a hardened hardware layout netlist, wherein the hardened hardware layout netlist provides a layout for fabricating an environmentally hardened IC.

Example 2 includes the subject matter of Example 1, wherein the hardware layout netlist is received from an electronic design automation (EDA) tool.

Example 3 includes the subject matter of Example 2, further comprising generating the hardened hardware layout netlist using the EDA tool.

Example 4 includes the subject matter of any one of Examples 1-3, wherein the group of hardware components comprises one or more hardware component buckets, and the method comprises selecting a hardware component bucket from the one or more hardware component buckets and replacing the one or more hardware components of the at least a portion of the hardware layout netlist with one or more hardware components from the selected hardware component bucket.

Example 5 includes the subject matter of Example 4, wherein the one or more hardware component buckets is provided via a user input.

Example 6 includes the subject matter of any one of Examples 1-5, wherein the replacing comprises replacing a single hardware component from the at least a portion of the hardware layout netlist with a single other component from the group of hardware components.

Example 7 includes the subject matter of any one of Examples 1-5, wherein the replacing comprises replacing a single hardware component from the at least a portion of the hardware layout netlist with a plurality of components from the group of hardware components.

Example 8 includes the subject matter of any one of Examples 1-7, wherein the interrogating comprises interrogating at least a portion of the hardware layout netlist based on a received input that defines the at least a portion of the hardware layout netlist.

Example 9 includes the subject matter of any one of Examples 1-8, wherein the one or more predetermined hardening criteria comprises a combination of factors associated with effects due to one or more of a single event transient (SET), a single event upset (SEU), and electromigration (EM).

Example 10 includes the subject matter of any one of Examples 1-9, further comprising reiterating at least the interrogating and the replacing on successive versions of the hardened hardware layout netlist until the at least a portion of the hardware layout netlist meets all of the predetermined hardening criteria.

Example 11 is a system configured to produce an environmentally hardened hardware layout netlist. The system includes at least one processor, and a storage medium operatively coupled to the at least one processor. The storage medium is configured to store instructions that, when executed by the at least one processor, cause the at least one processor to perform operations comprising receiving a hardware layout netlist for an integrated circuit (IC); initializing a group of hardware components for potential use within the IC; interrogating at least a portion of the hardware layout netlist, wherein the interrogating comprises determining if the at least a portion of the hardware layout netlist meets one or more predetermined hardening criteria; and in response to the at least a portion of the hardware layout netlist not meeting the one or more predetermined hardening criteria, replacing one or more hardware components of the at least a portion of the hardware layout netlist with one or more hardware components from the group of hardware components in order to generate the environmentally hardened hardware layout netlist, wherein the environmentally hardened hardware layout netlist provides a layout for fabricating an environmentally hardened IC.

Example 12 includes the subject matter of Example 11, wherein the hardware layout netlist is received from an electronic design automation (EDA) tool.

Example 13 includes the subject matter of Example 12, wherein the operations further comprise generating the hardened hardware layout netlist using the EDA tool.

Example 14 includes the subject matter of any one of Examples 11-13, wherein the group of hardware components comprises one or more hardware component buckets, and the operations further comprise selecting a hardware component bucket from the one or more hardware component buckets and replacing the one or more hardware components of the at least a portion of the hardware layout netlist with one or more hardware components from the selected hardware component bucket.

Example 15 includes the subject matter of Example 14, further comprising a user interface, wherein the one or more hardware component buckets is determined by an input received via the user interface.

Example 16 includes the subject matter of any one of Examples 11-15, wherein the replacing comprises replacing a single hardware component from the at least a portion of the hardware layout netlist with a single other component from the group of hardware components.

Example 17 includes the subject matter of any one of Examples 11-15, wherein the replacing comprises replacing a single hardware component from the at least a portion of the hardware layout netlist with a plurality of components from the group of hardware components.

Example 18 includes the subject matter of any one of Examples 11-17, further comprising a user interface, and wherein the interrogating comprises interrogating at least a portion of the hardware layout netlist based on an input received via the user interface, wherein the input defines the at least a portion of the hardware layout netlist.

Example 19 includes the subject matter of any one of Examples 11-18, wherein the one or more predetermined hardening criteria comprises a combination of factors associated with effects due to one or more of a single event transient (SET), a single event upset (SEU), and electromigration (EM).

Example 20 includes the subject matter of any one of Examples 11-19, wherein the operations further comprise reiterating at least the interrogating and the replacing on successive versions of the hardened hardware layout netlist until the at least a portion of the hardware layout netlist meets all of the predetermined hardening criteria.

Example 21 is a computer program product including one or more non-transitory machine-readable media having instructions encoded thereon that when executed by at least one processor causes a process to be carried out for environmentally hardening an integrated circuit (IC). The process includes receiving a hardware layout netlist for the IC; initializing a group of hardware components for potential use within the IC; interrogating at least a portion of the hardware layout netlist, wherein the interrogating comprises determining if the at least a portion of the hardware layout netlist meets one or more predetermined hardening criteria; and in response to the at least a portion of the hardware layout netlist not meeting the one or more predetermined hardening criteria, replacing one or more hardware components of the at least a portion of the hardware layout netlist with one or more hardware components from the group of hardware components in order to generate a hardened hardware layout netlist, wherein the hardened hardware layout netlist provides a layout for fabricating an environmentally hardened IC.

Example 22 includes the subject matter of Example 21, wherein the hardware layout netlist is received from an electronic design automation (EDA) tool.

Example 23 includes the subject matter of Example 22, further comprising generating the hardened hardware layout netlist using the EDA tool.

Example 24 includes the subject matter of any one of Examples 21-23, wherein the group of hardware components comprises one or more hardware component buckets, and the method comprises selecting a hardware component bucket from the one or more hardware component buckets and replacing the one or more hardware components of the at least a portion of the hardware layout netlist with one or more hardware components from the selected hardware component bucket.

Example 25 includes the subject matter of Example 24, wherein the one or more hardware component buckets is provided via a user input.

Example 26 includes the subject matter of any one of Examples 21-25, wherein the replacing comprises replacing a single hardware component from the at least a portion of the hardware layout netlist with a single other component from the group of hardware components.

Example 27 includes the subject matter of any one of Examples 21-25, wherein the replacing comprises replacing a single hardware component from the at least a portion of the hardware layout netlist with a plurality of components from the group of hardware components.

Example 28 includes the subject matter of any one of Examples 21-27, wherein the interrogating comprises interrogating at least a portion of the hardware layout netlist based on a received input that defines the at least a portion of the hardware layout netlist.

Example 29 includes the subject matter of any one of Examples 21-28, wherein the one or more predetermined hardening criteria comprises a combination of factors associated with effects due to one or more of a single event transient (SET), a single event upset (SEU), and electromigration (EM).

Example 30 includes the subject matter of any one of Examples 21-29, wherein the process further comprises reiterating at least the interrogating and the replacing on successive versions of the hardened hardware layout netlist until the at least a portion of the hardware layout netlist meets all of the predetermined hardening criteria.

What is claimed is:

1. A processor-implemented method for environmentally hardening an integrated circuit (IC), the method comprising:
   receiving a hardware layout netlist for the IC;
   initializing a group of hardware components for potential use within the IC;
   interrogating at least a portion of the hardware layout netlist, wherein the interrogating comprises determining if the at least a portion of the hardware layout netlist meets one or more predetermined hardening criteria; and
   in response to the at least a portion of the hardware layout netlist not meeting the one or more predetermined hardening criteria, replacing one or more hardware components of the at least a portion of the hardware layout netlist with one or more hardware components from the group of hardware components as part of a procedure to generate a hardened hardware layout netlist, wherein the hardened hardware layout netlist provides a layout for fabricating an environmentally hardened IC.

2. The processor-implemented method of claim 1, wherein the hardware layout netlist is received from an electronic design automation (EDA) tool.

3. The processor-implemented method of claim 2, further comprising generating the hardened hardware layout netlist using the EDA tool.

4. The processor-implemented method of claim 1, wherein the group of hardware components comprises one or more hardware component buckets, and the method comprises selecting a hardware component bucket from the one or more hardware component buckets and replacing the one or more hardware components of the at least a portion of the hardware layout netlist with one or more hardware components from the selected hardware component bucket.

5. The processor-implemented method of claim 1, wherein the replacing comprises replacing a single hardware component from the at least a portion of the hardware layout netlist with a single other component from the group of hardware components.

6. The processor-implemented method of claim 1, wherein the replacing comprises replacing a single hardware component from the at least a portion of the hardware layout netlist with a plurality of components from the group of hardware components.

7. The processor-implemented method of claim 1, wherein the interrogating comprises interrogating at least a portion of the hardware layout netlist based on a received input that defines the at least a portion of the hardware layout netlist.

8. The processor-implemented method of claim 1, wherein the one or more predetermined hardening criteria comprises a combination of factors associated with effects due to one or more of a single event transient (SET), a single event upset (SEU), and electromigration (EM).

9. The processor-implemented method of claim 1, further comprising reiterating at least the interrogating and the replacing on successive versions of the hardened hardware layout netlist until the at least a portion of the hardware layout netlist meets all of the predetermined hardening criteria.

10. A system configured to produce an environmentally hardened hardware layout netlist, the system comprising:
at least one processor; and
a storage medium operatively coupled to the at least one processor and configured to store instructions that when executed by the at least one processor cause the at least one processor to perform operations comprising
receiving a hardware layout netlist for an integrated circuit (IC);
initializing a group of hardware components for potential use within the IC;
interrogating at least a portion of the hardware layout netlist, wherein the interrogating comprises determining if the at least a portion of the hardware layout netlist meets one or more predetermined hardening criteria; and
in response to the at least a portion of the hardware layout netlist not meeting the one or more predetermined hardening criteria, replacing one or more hardware components of the at least a portion of the hardware layout netlist with one or more hardware components from the group of hardware components in order to generate the environmentally hardened hardware layout netlist, wherein the environmentally hardened hardware layout netlist provides a layout for fabricating an environmentally hardened IC.

11. The system of claim 10, wherein the hardware layout netlist is received from an electronic design automation (EDA) tool.

12. The system of claim 11, wherein the operations further comprise generating the hardened hardware layout netlist using the EDA tool.

13. The system of claim 10, wherein the group of hardware components comprises one or more hardware component buckets, and the operations further comprise selecting a hardware component bucket from the one or more hardware component buckets and replacing the one or more hardware components of the at least a portion of the hardware layout netlist with one or more hardware components from the selected hardware component bucket.

14. The system of claim 13, further comprising a user interface, wherein the one or more hardware component buckets is determined by an input received via the user interface.

15. The system of claim 10, wherein the replacing comprises replacing a single hardware component from the at least a portion of the hardware layout netlist with a single other component from the group of hardware components.

16. The system of claim 10, wherein the replacing comprises replacing a single hardware component from the at least a portion of the hardware layout netlist with a plurality of components from the group of hardware components.

17. The system of claim 10, further comprising a user interface, and wherein the interrogating comprises interrogating at least a portion of the hardware layout netlist based on an input received via the user interface, wherein the input defines the at least a portion of the hardware layout netlist.

18. The system of claim 10, wherein the one or more predetermined hardening criteria comprises a combination of factors associated with effects due to one or more of a single event transient (SET), a single event upset (SEU), and electromigration (EM).

19. The system of claim 10, wherein the operations further comprise reiterating at least the interrogating and the replacing on successive versions of the hardened hardware layout netlist until the at least a portion of the hardware layout netlist meets all of the predetermined hardening criteria.

20. A computer program product including one or more non-transitory machine-readable media having instructions encoded thereon that when executed by at least one processor causes a process to be carried out for environmentally hardening an integrated circuit (IC), the process comprising:
receiving a hardware layout netlist for the IC;
initializing a group of hardware components for potential use within the IC;
interrogating at least a portion of the hardware layout netlist, wherein the interrogating comprises determining if the at least a portion of the hardware layout netlist meets one or more predetermined hardening criteria; and
in response to the at least a portion of the hardware layout netlist not meeting the one or more predetermined hardening criteria, replacing one or more hardware components of the at least a portion of the hardware layout netlist with one or more hardware components from the group of hardware components in order to generate a hardened hardware layout netlist, wherein the hardened hardware layout netlist provides a layout for fabricating an environmentally hardened IC.

* * * * *